T. DAVIS.
PNEUMATIC STARTER FOR AUTOMOBILES.
APPLICATION FILED FEB. 13, 1918.

1,294,058.

Patented Feb. 11, 1919.
6 SHEETS—SHEET 1.

Inventor:
Thomas Davis,
by Spear, Middleton, Donaldson & Spear
Attys.

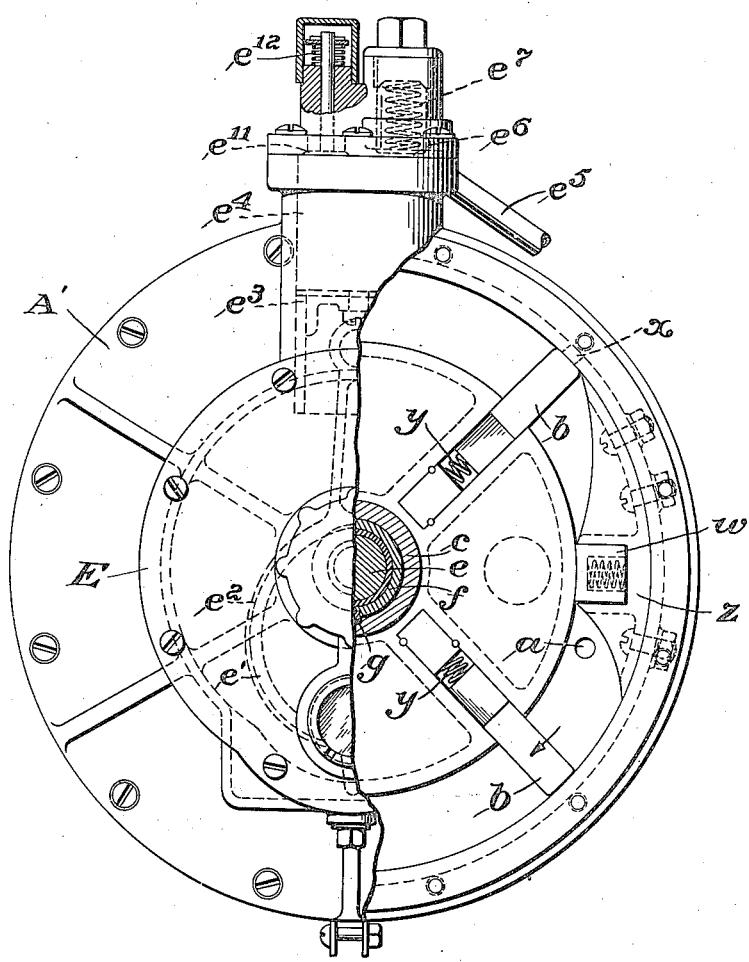

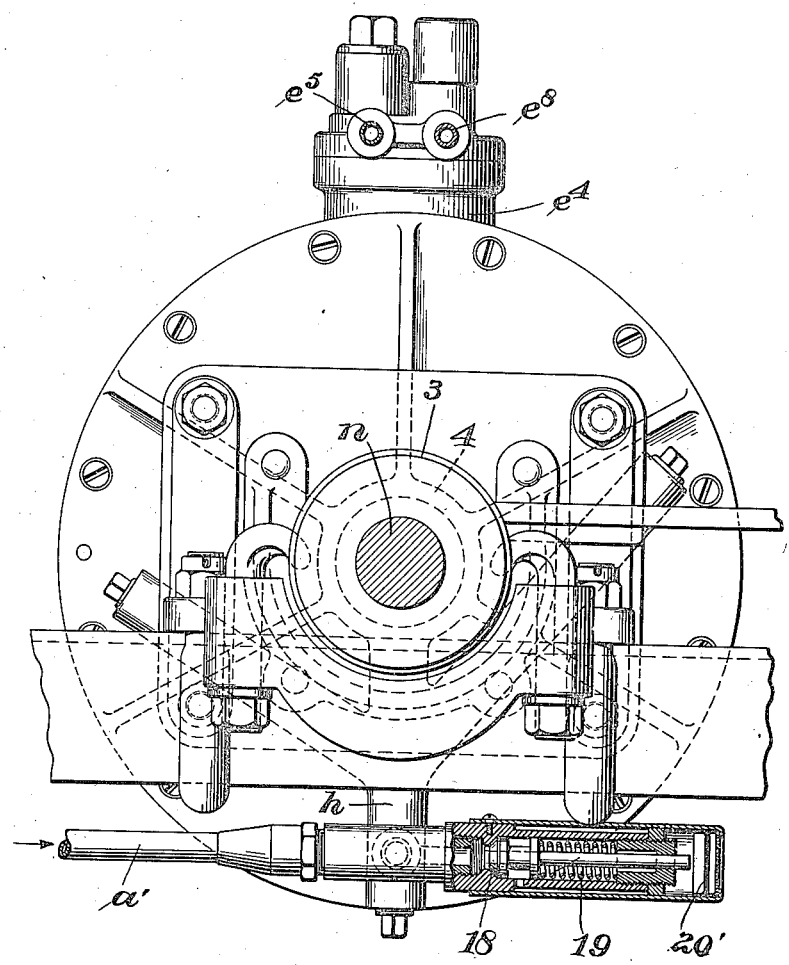

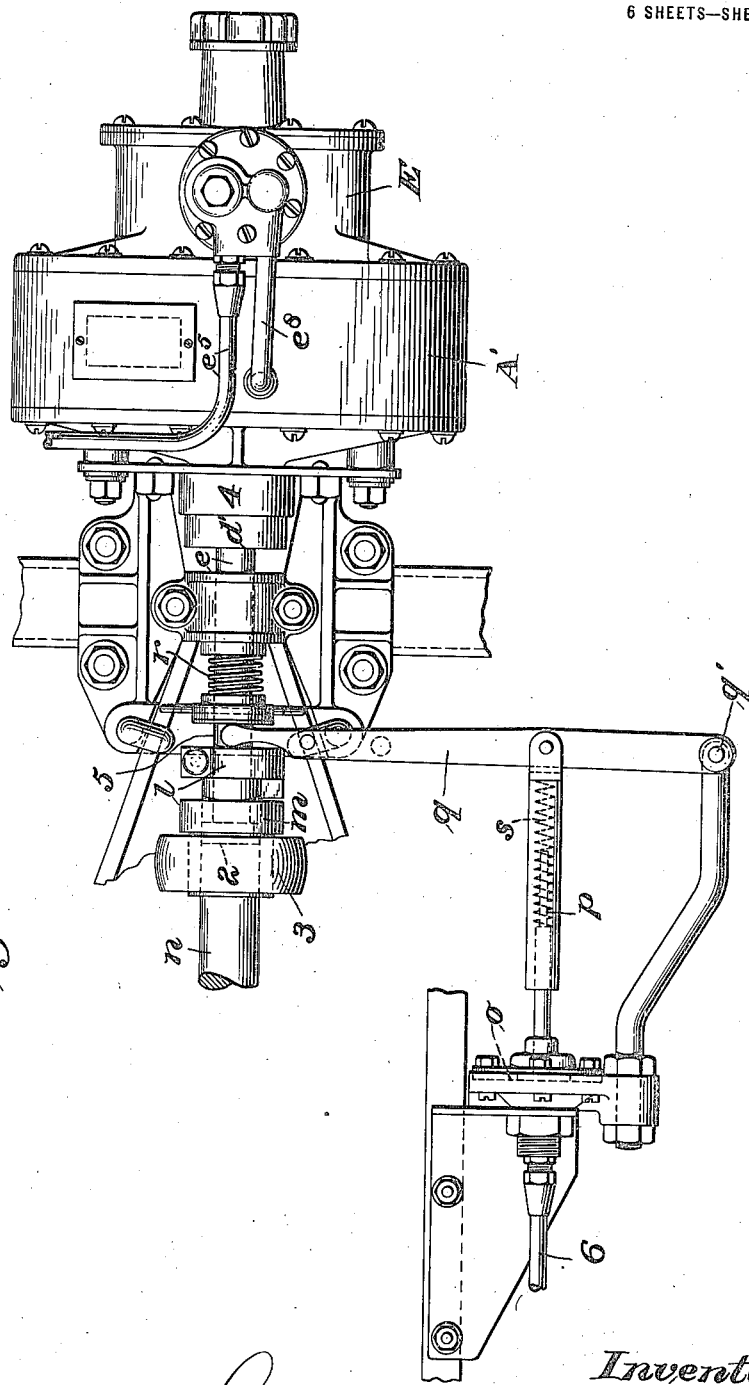

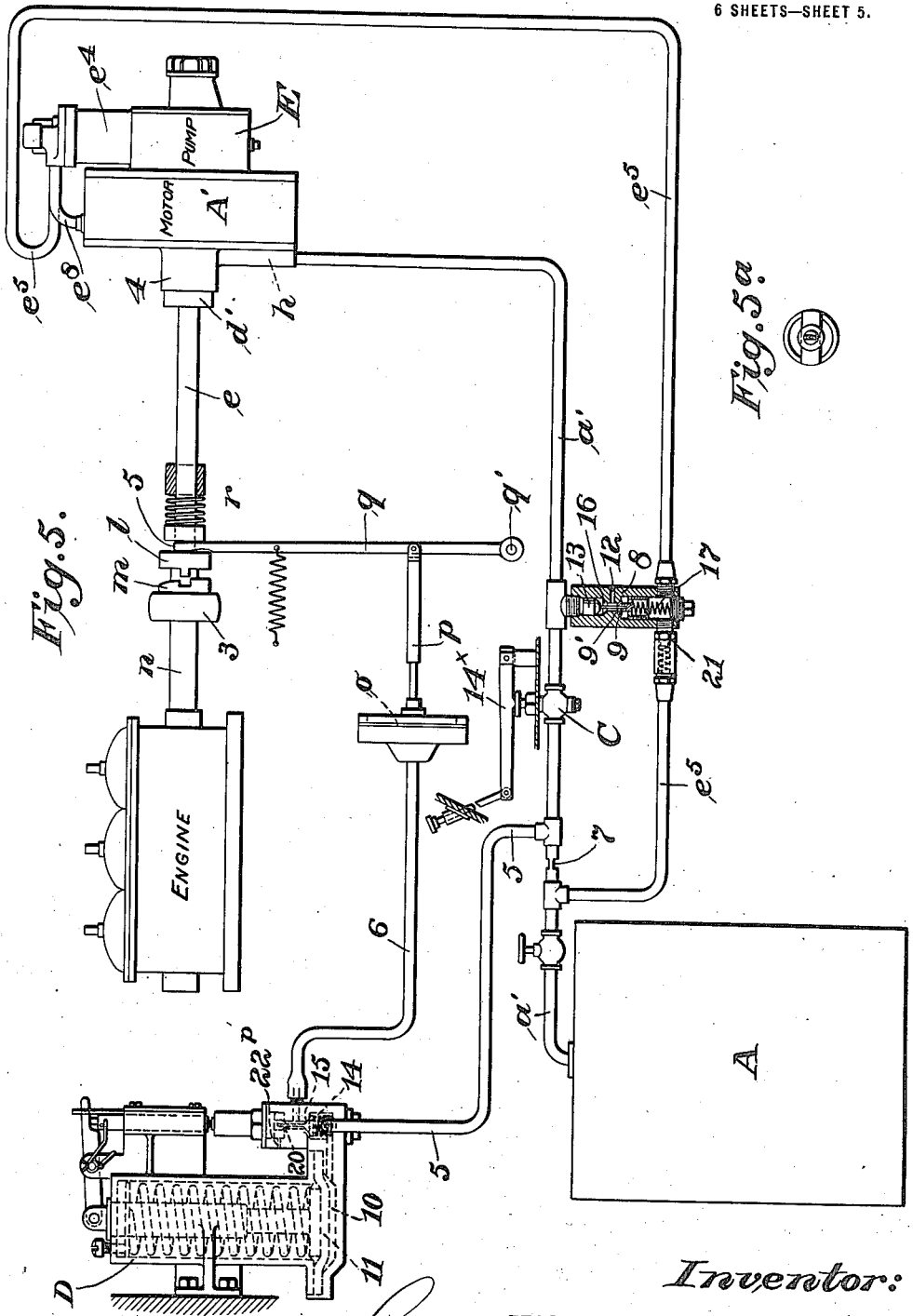

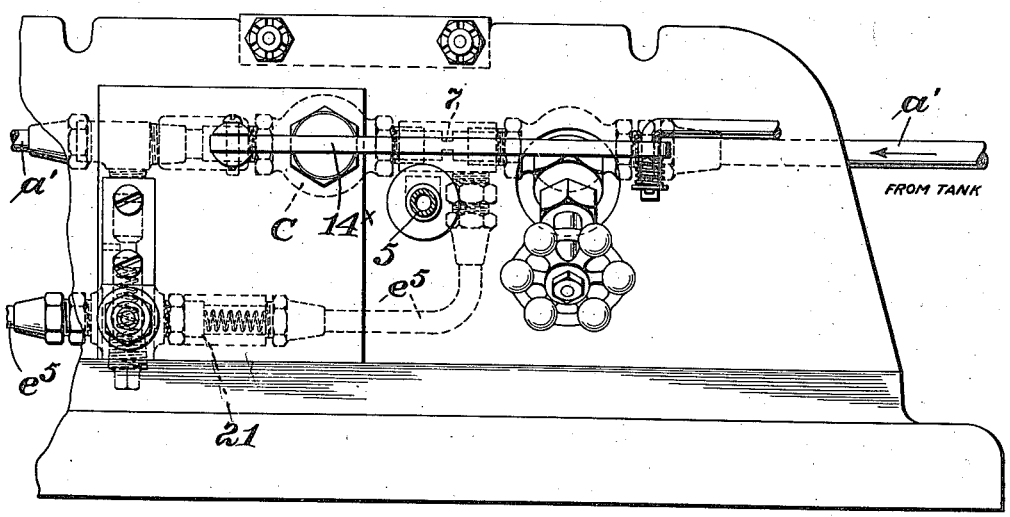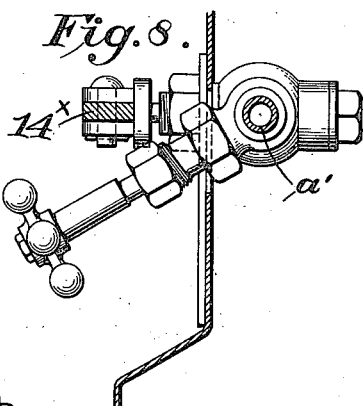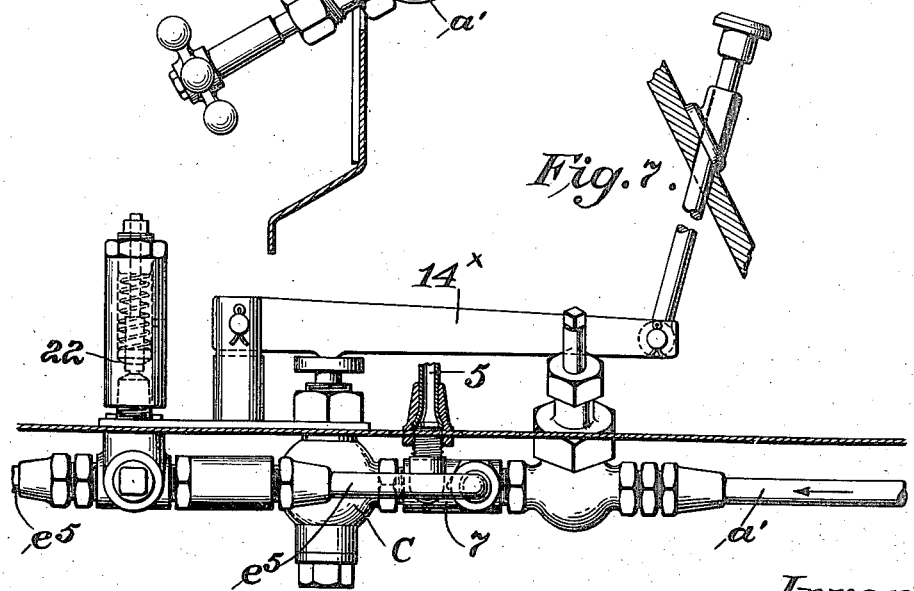

UNITED STATES PATENT OFFICE.

THOMAS DAVIS, OF DETROIT, MICHIGAN, ASSIGNOR TO THE JOHN FORD STARTER COMPANY, A CORPORATION OF MARYLAND.

PNEUMATIC STARTER FOR AUTOMOBILES.

1,294,058. Specification of Letters Patent. Patented Feb. 11, 1919.

Application filed February 13, 1918. Serial No. 216,927.

*To all whom it may concern:*

Be it known that I, THOMAS DAVIS, a citizen of the United States, and resident of Detroit, Michigan, have invented certain new and useful Improvements in Pneumatic Starters for Automobiles, of which the following is a specification.

The invention relates to an internal combustion engine starting apparatus of the general type disclosed in Letters Patent of the United States, granted to Charles G. Eidson, Thomas Davis, and David E. Crouse, #1233855, July 17, 1917, and the present invention concerns an arrangement by which air pressure is used to set the clutch means in action in such type of organization.

In the drawings,

Fig. 2 is an end view of the starting motor.

Fig. 3 is a view from the opposite side from that shown in Fig. 2.

Fig. 4 is a plan view of parts shown in Fig. 1, together with certain other parts.

Figure 1:
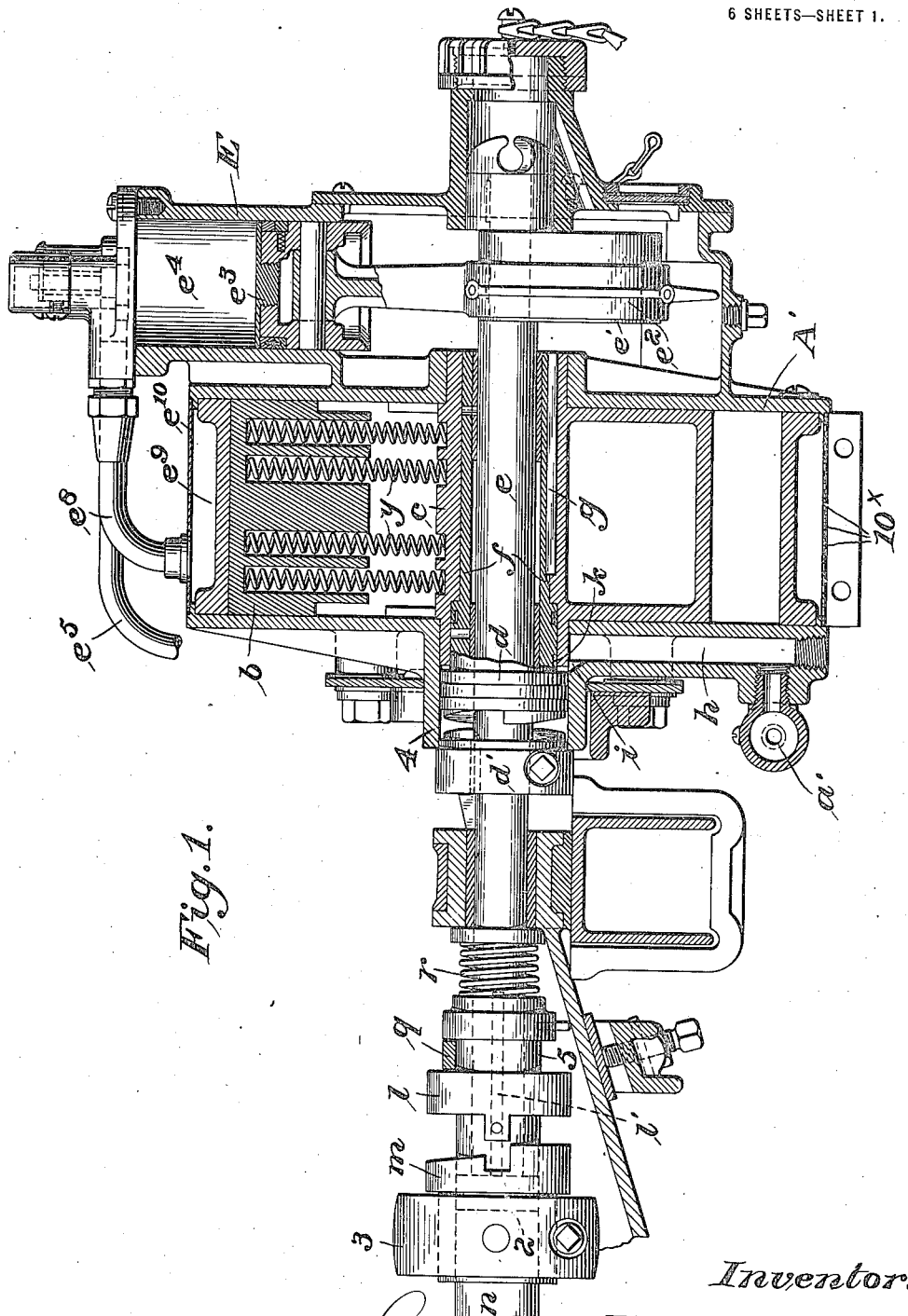
Figure 1 is a vertical sectional view through the starting motor, parts being shown in elevation.

Fig. 5$^a$ is a view of a detail plan view of valve 9 of Fig. 5, with stem 16 of piston 13 in section.

Fig. 5, is a view in the nature of a diagram.

Fig. 6 is a plan view of part of the connection of system.

Fig. 7 is an elevation of the parts of Fig. 6, partly in section.

Fig. 8 is a detailed sectional view of the treadle lever of Fig. 7 with adjacent parts in elevation.

In these drawings a compressed air tank A is connected by a pipe $a'$ with the starting motor A' and a pipe $e^5$ extends from the pump E to the tank to supply the same with compressed air.

In starting up with the tank charged a suitable valve is opened and air is admitted to the casing of the motor through the port $a$ Fig. 2, and this acting against the blade $b$ will set the rotor in rotation. The exhaust port is indicated at $x$. There are four blades $b$ on the rotor pressed outwardly by springs $y$, and there are two sets of inlet and exhaust ports $a$ and $x$. The rotor casing has an abutment $z$ with a spring pressed member at $w$ to bear against the cylindrical face of the rotor. Each blade takes air pressure after it passes the abutment in the direction of the arrow, and as it approaches the opposite abutment it uncovers the exhaust port for the discharge of air. This rotor has a quill or hub $c$ journaled in the fixed casing or stator, and this quill or hub has a splined connection at $g$ with a sleeve $f$ which has fixed thereto a clutch member $d$. Within the sleeve $f$ there is a shaft $e$ and at the right hand end of this shaft an eccentric $e'$ is carried thereon, working in a strap $e^2$ connected through a rod with the pump piston $e^3$ working in the cylinder $e^4$ of the pump E. This pump cylinder is connected through the pipe $e^5$ with the compressed air tank, as above stated, and a suitable valve is arranged at $e^6$ to act as a check against the return of the air from the tank to the pump cylinder, and this check valve is pressed by a spring $e^7$. The inlet pipe $e^8$ for the air to the pump is connected with the space $e^9$ surrounding the casing of the rotor, this space being covered by a plate $e^{10}$, which, at the proper point, is perforated as indicated at $10^x$ for the inlet of air. A check valve opening toward the pump cylinder is arranged at $e^{11}$ to allow the air to enter but to prevent its escape back through the inlet pipe $e^8$, this check valve being pressed by a spring $e^{12}$. The clutch member $d$, as stated above, is fixed or made in one piece with the inner sleeve $f$, which sleeve is capable of longitudinal movement because of its splined connection at $g$, with the rotor quill, and when the air is admitted to the rotor chamber it is also admitted through the port $h$ and the channel $i$ to the space $k$ back of the clutch member $d$, which, therefore, acts as a piston within the extension 4 of the rotor casing and the axial movement of the clutch member $d$ causes it to engage the clutch member $d'$, which is fixed to the shaft $e$, and as the clutch member $d$ is now in rotation, because of the splined connection $g$ with the quill or hub of the rotor, the clutch member $d'$ will be set in rotation, together with the shaft $e$, and also this shaft $e$ will be moved axially toward the left, because of the air pressure at $k$ continuing to act on and move the clutch $d$ leftward. This shaft has keyed or fixed thereto the clutch member $l$, the key being indicated at $l'$, and this holds the clutch member $l$ against both rotary and axial movement relative to the shaft $e$, in other words, the clutch member $l$ is fixed rigidly to said shaft $e$. The movement of the shaft $e$ toward the left under the action of the clutch $d$ working as a piston in the cylindrical part 4 of the fixed casing will cause the clutch member $l$ to engage the clutch member $m$ which is fixed on the engine shaft $n$, and thus the latter will be set in rotation. The end of this engine shaft is indicated at 2, and 3 indicates the fan pulley of the Ford machine.

The engine shaft is thus driven and having started the engine the clutch $d$, $d'$, will automatically release, due to the member $d'$ fixed on the shaft $e$ now clutched to the engine through the members $l$ and $m$, running ahead of the member $d$, this action of running ahead being permitted by the inclined surfaces of the teeth between the members $d'$ and $d$.

The shaft $e$ will continue to rotate, due to the clutch members $m$ and $l$ rotating in engagement and thus the pump will be operated to store air in the tank and this will continue until the air pressure in the tank reaches a predetermined degree when a diaphragm at $o$ will receive the air pressure through a suitable governor, similar for instance to that disclosed in Letters Patent of the United States of Eidson, and Davis, No. 1,192,774, July 23, 1916, or at 60 of said patent of Eidson, Davis and Crouse, and the movement of this diaphragm will be imparted through the rod $p$ to the lever $q$ pivoted at $q'$, and as this lever is in engagement with the groove 5 of the clutch member $l$, this member will be withdrawn from the clutch member $m$ against the pressure of spring $r$ and the parts of the starter may then remain at rest until needed again.

In this action of withdrawing the clutch member $l$ from the member $m$, the shaft $e$ will move with the clutch member $l$ back to its former position, and this action can take place, notwithstanding the fact that the shaft $e$ carries the eccentric $e'$ of the pump mechanism, it being possible for this eccentric to slide in relation to the eccentric strap. The clutch member $l$ is pressed by the spring $r$, whose function is to maintain the clutch $l$ in engagement with the clutch member $m$, for effecting the pumping operation up to the time that the clutch member $l$ is positively thrown out of operation by the lever $q$.

This spring will also perform another office, in that it will throw the clutch member $l$ into engagement with the member $m$ in case the air pressure leaks out of the tank down to a predetermined degree, for it will be understood that the clutch is held out of operation by the connections $p$ and $q$ when the pressure in the tank is allowed by the governor to act on the diaphragm, $o$, but should this pressure be reduced through leakage and the connections $q$ and $p$ be not held by the pressure from the tank, the spring will then act to throw in the clutch $l$ which will set the pump in operation to restore the pressure. In other words, the apparatus while the car is running will maintain the predetermined degree of pressure in the tank, even though the tank leaks, because under these conditions the clutch will be periodically thrown into engagement with the clutch member $m$, the pump operated, and the pressure thereby will be raised in the tank until the connections $p$ and $q$ throw the clutch out again, and on reduction of the pressure the spring $r$ will throw the clutch in again and so on as long as the car is running.

A spring $s$ is arranged in the link $p$, this being pressed upon by the diaphragm stem $o'$. This spring will enable the operator to set the clutches $l$ and $m$ by sliding the shaft $e$ at such time that pressure in the tank is maintained at the maximum or thereabout, this spring yielding sufficiently to allow the clutch to be set notwithstanding the fact that the diaphragm $o$, because of the air pressure thereagainst, holds the stem $p$ against yielding movement.

It will be observed that the cylinder 4 in which the pistonlike clutch member $d$ works forms an extension of the stator casing.

Referring to Fig. 5 which is a diagram of the system the governor such as shown in the patents above mentioned #1,192,774 is indicated generally at D the pipe leading thereto from the main pressure pipe line being shown at 5 and the air pipe between the governor and the diaphragm $o$ being shown at 6. The governor being of the same construction as that disclosed in the patent referred to, is of such a character that it will not operate to deliver air to the diaphragm $o$ to throw out the clutch until a certain pressure is reached whereupon the governor will act quickly and let the air flow to the diaphragm to throw out the clutch, and on the contrary when the pressure is falling the governor will not act until a certain low degree of pressure is reached whereupon the governor will quickly open a port leading to the atmosphere allowing the diaphragm to collapse and the clutch to be thrown in to connect the engine with the pump.

In the main line pressure pipe $a'$ at a point 7 between the air tank and the pipe 5 which delivers air to the controller I place a choke port or a restriction in the pipe $a'$, which when the manually operated valve C is opened will allow the air pressure from the tank to pass to the rotor to operate the same, but at the same time will cause a reduced pressure to exist on that side of the choke port, or restriction, upon which the pipe 5 is located, it being understood that the reduction in pressure is due to the choke and to the exhausting of the air through the motor, a quick reduction of pressure therefore takes place in the pipe 5 with the result that the diaphragm is allowed to collapse for the ready throwing in of the clutch and the operation of the pump for a long enough period to fully restore the air pressure in the tank. The quick reduction of pressure just mentioned takes place in the space 10 below the diaphragm 11, resulting in the closing of the valve 14 of the patent above referred to, upon its seat 15 and not only cutting off the air pressure to the diaphragm but opening the valve at 20 to allow the air to escape from the diaphragm chamber through the port $22^p$.

The choke port so controls the governor as to insure the immediate replenishing of the air in the tank when a starting action is performed.

Without the choke port, unless enough air had been used to bring the pressure throughout the system and tank down to the point where the governor operates to release air from the diaphragm for its collapse and the removal of its influence from the clutch, the pump would be cut out of operation soon after the start was made, and thereby the air would not be fully replenished in the tank on that start, this cutting out of the clutch and the stopping of the pump being due to the quick rebuilding of pressure at the governor and the changing of its valves to deliver air pressure to the diaphragm $o$.

I have provided an escape valve device connected with the pipe $e^5$ which leads the air from the pump E to the tank A. This pipe $e^5$ connects with the main pipe $a'$ at a point beyond the choke port 7. This relief valve device, comprises a casing 8, communicating with the pipes $a'$ and $e^5$. The casing contains a valve 9 seated at 9' and pressed by a spring 17. When this valve is off its seat the air coming from the pump will pass through the valve and the port 12 to the atmosphere.

The valve 9 is opened by a piston 13 in the casing which is subjected to the pressure in the main pipe $a'$ when the operator by pressing on the treadle $14^x$ opens the main air valve C. When this valve C is opened the air pressure passes to the motor and starts the same and at the same time the pressure acting on the piston 13 will cause the pin or extension 16 carried thereby to force the valve 9 open against its spring pressure so that the air from the pump will be free to pass to the atmosphere and therefore the pump will run free and this will prevent additional load being imposed upon the rotor. After the engine picks up and begins to drive the pump and the operator takes his foot off the treadle $14^x$ the pressure on the piston 13 will cease and the air coming from the pump will close the valve 9 aided by the spring 17, and the air will go through the valve casing 8 and the pipe $e^5$ to the main air pipe $a'$ at a point beyond the choke port 7 and thence to the air tank. It will be seen from the above that when the rotor is first started the pump will be connected with the atmosphere but when the engine picks up, the rotor will be thrown out of service and the pump will then be connected with the air tank instead of with the atmosphere and pressure will be restored in the tank.

I have also provided a relief valve at 18 adjacent the rotor which in case of back firing will open so that the rotor acting under these conditions as a pump will not twist the shaft or break the clutch, because the pressure will be free to escape through this valve which is loaded by a suitable spring 19 to hold only a predetermined degree of pressure from the tank to turn the rotor as predetermined upon.

At 20' is shown a felt screen, to keep out dust from this valve device.

At 21 I indicate a check valve, which may be of any ordinary type. As the flow of air is from the pump toward the tank this check valve is arranged to close toward the pump.

A safety valve is indicated at 22 to open for the escape of over pressure from the system in the event that the governor fails to stop the pump when the predetermined pressure is reached in the tank. As this may be a plain safety valve of any desired construction it has not been thought necessary to illustrate it in detail.

I claim:

1. In combination an engine shaft, a compressed air reservoir, a starting motor comprising a rotor and a casing therefor, a shaft slidable axially through the said rotor, a pump operated from the said shaft, a clutch between the slidable shaft and the engine shaft, a clutch between the rotor and the slidable shaft, and means for supplying air pressure for turning the rotor and for sliding the said shaft, substantially as described.

2. In combination an engine shaft, a compressed air reservoir, a starting motor comprising a rotor and a casing therefor, a shaft slidable axially through the said rotor, a pump operated from the said shaft, a clutch between the slidable shaft and the engine shaft, a clutch between the rotor and the slidable shaft, and means for supplying air pressure for turning the rotor and for sliding the said shaft, said last mentioned clutch comprising a member splined to the rotor and a member fixed on the slidable shaft, the splined member receiving air pressure to move it into engagement with the other member and to slide the said shaft to set the first mentioned clutch, substantially as described.

3. In combination an engine shaft, a compressed air reservoir, a starting motor comprising a rotor and a casing therefor, a shaft slidable axially through the said rotor, a pump operated from the said shaft, a clutch between the slidable shaft and the engine shaft, a clutch between the rotor and the slidable shaft and means for supplying air pressure for turning the rotor and for sliding the said shaft, said last mentioned clutch comprising a member splined to the rotor and working piston-like in a cylinder forming a part of the stator, and comprising also a member fixed on the slidable shaft and a conduit for delivering air to the said cylinder back of the piston member, to set the same in engagement with its companion member on the shaft and to slide said shaft to set the clutch between the said shaft and the engine shaft, substantially as described.

4. In combination with an air tank an engine, a starting rotor, a pump operated when the engine is started to restore air to the tank, a clutch between the engine and the pump, a diaphragm subjected to air pressure and controlling the clutch, a governor for controlling the air pressure to the diaphragm said governor supplying air to the diaphragm when a certain maximum pressure is reached, and allowing the air to escape from the diaphragm to throw in the clutch when a certain reduced pressure is reached, a main air pipe between the air tank and the motor, having a choke port therein, and a connection to the governor from said pipe at a point beyond the choke port in respect to the said air tank substantially as described.

5. In combination with an air tank an engine, a starting motor, a pump operated when the engine is started to restore air to the tank, a clutch between the engine and the pump, a diaphragm subjected to air pressure and controlling the clutch, a governor for controlling the air pressure to the diaphragm, said governor supplying air to the diaphragm, when a certain maximum pressure is reached and allowing the air to escape from the diaphragm to throw in the clutch when a certain reduced pressure is reached, a main air pipe between the air tank and the motor, having a choke port therein, a connection to the governor from said pipe at a point beyond the choke port in respect to said air tank, and a valve manually operated and controlling the passage of air through the said main air pipe, said valve being located between the choke port on the motor, substantially as described.

6. In combination with an air tank an engine, a starting motor, a pump, operated when the engine is started to restore air to the tank, a clutch between the engine and the pump, a diaphragm subjected to air pressure and controlling the clutch, a governor for controlling the air pressure to the diaphragm, said governor supplying air to the diaphragm when a certain maximum pressure is reached and allowing the air to escape from the diaphragm to throw in the clutch when a certain reduced pressure is reached, a main air pipe between the air tank and the motor, having a choke port therein, and a connection to the governor from said pipe at a point beyond the choke port in respect to the said air tank and a pipe leading from the pump and connecting with the tank and by-passing the choke port, substantially as described.

7. In combination, an engine, a starting motor, an air tank, a pipe extending from the air tank to the starting motor, a pump, and a pipe connection between the pump and the tank to restore pressure to the latter and a relief valve automatically operating to connect the pump with the atmosphere when the motor is first started, said valve closing when the engine picks up and begins driving the pump.

8. In combination in a starting apparatus for internal combustion engines, an air tank, a starting motor, a pipe connection between the air tank and motor, a clutch connection between the motor and the engine, a pump to be driven by the engine when started, a pipe for delivering air from the pump to the air tank, a main valve controlling the passage of air from the tank to the motor, said valve being manually operable and an air relief valve for connecting the pump with the atmosphere said valve being controlled by the pressure in the main line pipe beyond the manually operable valve to open under the pressure beyond said valve to relieve the pump and closing automatically when the main valve is closed, said pump and motor having connection with the same shaft whereby the pump is driven when the motor is started, substantially as described.

9. In combination an engine, a starting motor, a pump, an air tank, a pipe connecting the air tank with the motor, a pipe connecting the pump with the air tank, a valve casing communicating with both of said pipes, a valve in said casing which when open allows the escape of air from the air pipe leading from the pump to the tank, and a piston in the valve casing subjected to the air pressure in the main line pipe to open the said valve when pressure is on the said main pipe, substantially as described.

10. In combination with an engine, a starting motor, an air tank, a pipe connection between the air tank and motor and an air relief valve in said pipe connection to open when the pressure exceeds a certain degree consequent upon back firing and the conversion of the motor into a pump and a pump driven by the engine and having connection with the air tank to deliver air thereto, substantially as described.

In testimony whereof, I affix my signature.

THOMAS DAVIS.